(12) United States Patent
Hartman et al.

(10) Patent No.: US 9,026,274 B2
(45) Date of Patent: May 5, 2015

(54) METHOD OF CONTROLLING AN ELECTRIC PROPULSION SYSTEM

(75) Inventors: Jonathan Hartman, Cheshire, CT (US); Timothy Fred Lauder, Oxford, CT (US); Russell L. Halstead, Orange, CT (US); Christopher L. Winslow, Trumbull, CT (US); Michael L. Hardy, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 437 days.

(21) Appl. No.: 13/600,772

(22) Filed: Aug. 31, 2012

(65) Prior Publication Data

US 2014/0067166 A1 Mar. 6, 2014

(51) Int. Cl.
*H02P 7/06* (2006.01)
*B64D 31/00* (2006.01)
*H02P 7/00* (2006.01)
*B64D 31/02* (2006.01)

(52) U.S. Cl.
CPC ........ *H02P 7/06* (2013.01); *B64D 31/00* (2013.01); *H02P 7/00* (2013.01); *B64D 31/02* (2013.01)

(58) Field of Classification Search
USPC .......... 701/1, 3, 15, 100; 244/5, 6, 17.11, 26, 244/52, 55, 56
See application file for complete search history.

(56) References Cited

U.S. PATENT DOCUMENTS

| | | | | |
|---|---|---|---|---|
| 4,071,207 A * | 1/1978 | Piasecki et al. | ............. | 244/23 D |
| 4,466,526 A * | 8/1984 | Howlett et al. | ............... | 477/113 |
| 4,720,633 A | 1/1988 | Nelson | | |
| 4,807,129 A * | 2/1989 | Perks | ................. | 701/3 |
| 6,917,173 B2 * | 7/2005 | Takagi | .......... | 318/444 |
| 7,098,811 B2 | 8/2006 | Augustin et al. | | |
| 7,108,232 B2 | 9/2006 | Hoh | | |
| 7,147,182 B1 * | 12/2006 | Flanigan | .......... | 244/6 |
| 7,472,863 B2 * | 1/2009 | Pak | ............. | 244/12.5 |
| 7,866,598 B2 | 1/2011 | Waide et al. | | |
| 7,871,032 B2 * | 1/2011 | Zhao et al. | .......... | 244/6 |
| 7,946,528 B2 * | 5/2011 | Yoeli | ............ | 244/76 R |
| 2003/0076069 A1 * | 4/2003 | Yamada et al. | ............. | 318/696 |
| 2004/0056620 A1 * | 3/2004 | Takagi | .......... | 318/444 |
| 2004/0093130 A1 * | 5/2004 | Osder et al. | ......... | 701/3 |
| 2005/0264253 A1 * | 12/2005 | Ivankovic | ............ | 318/685 |
| 2009/0035137 A1 * | 2/2009 | Jolly et al. | ............. | 416/145 |
| 2009/0140095 A1 * | 6/2009 | Sirohi et al. | ............. | 244/17.19 |
| 2009/0224096 A1 * | 9/2009 | Waide et al. | ............. | 244/60 |
| 2012/0072056 A1 * | 3/2012 | Hasan et al. | ......... | 701/3 |
| 2013/0147204 A1 * | 6/2013 | Botti et al. | .......... | 290/1 A |
| 2013/0166169 A1 * | 6/2013 | McCollough | ............. | 701/99 |

FOREIGN PATENT DOCUMENTS

| | | |
|---|---|---|
| EP | 1167110 A2 | 1/2002 |
| WO | 9306354 A1 | 4/1993 |

OTHER PUBLICATIONS

European Search Report for application 13182490.6, mailed Dec. 6, 2013, 6 pages.

* cited by examiner

*Primary Examiner* — John R Olszewski
*Assistant Examiner* — Truc M Do
(74) *Attorney, Agent, or Firm* — Cantor Colburn LLP (57) ABSTRACT

An apparatus is described comprising: at least one processor; and memory storing instructions that, when executed by the at least one processor, cause the apparatus to: regulate an operation of a motor based at least in part on a control imposed on an output torque of the motor and a rate of change of a speed of the motor.

15 Claims, 4 Drawing Sheets

METHOD OF CONTROLLING AN ELECTRIC PROPULSION SYSTEM

BACKGROUND

Control of an aircraft motor may be desirable to ensure proper and safe operation of the aircraft and its associated components. For example, operation of an electric motor aboard a helicopter may pose a risk or hazard to a gearbox or drive train if the motor is allowed to produce full torque at a low speed. Also, the motor may be capable of producing excessive speed or torque changes during operations, such as ground operations.

Designs may incorporate controls that are directly manipulated by the operator or pilot. For example, a potentiometer may be embedded within a pilot's control stick, allowing the pilot an unrestricted ability to directly manipulate the motor's commanded speed and torque.

BRIEF SUMMARY

An embodiment is directed to an apparatus comprising: at least one processor; and memory storing instructions that, when executed by the at least one processor, cause the apparatus to: regulate an operation of a motor based at least in part on a control imposed on an output torque of the motor and a rate of change of a speed of the motor.

An embodiment is directed to a system comprising: a motor; a switch; and a controller configured to regulate operation of the motor in accordance with a control imposed on an output torque of the motor and a rate of change of a speed of the motor based at least in part on a determined position of the switch.

An embodiment is directed to a method for regulating operation of a motor, the method comprising: regulating an operation of a motor based at least in part on a control imposed on an output torque of the motor and a speed of the motor.

Other embodiments are described below.

BRIEF DESCRIPTION OF THE DRAWINGS

The present disclosure is illustrated by way of example in the accompanying figures in which like reference numerals indicate similar elements, and in which.

DETAILED DESCRIPTION

In accordance with various embodiments of the disclosure, apparatuses, systems and methods are described for enhancing the operation of a helicopter. In some embodiments, a controller may execute one or more algorithms or methods to provide control of the helicopter's motor.

While largely described in connection with a helicopter, the techniques and methodologies described herein may be adapted to accommodate various motor applications. For example, the techniques and methodologies may be adapted to accommodate operations associated with marine vessels (e.g., boats, ships, yachts, submarines, etc.), automobiles (cars, trucks, etc.), other types of aircraft (e.g., airplanes, jets, etc.), etc.

Embodiments of the disclosure may increase or enhance the safety of a helicopter's operation, thereby enhancing the safety of the pilot and any crew or passengers onboard. Embodiments may enable a pilot to precisely govern a mode in which the pilot wishes the helicopter to operate (ground handling, taxi, flight, etc.). Embodiments may prevent a pilot from inadvertently commanding an undesired condition. Embodiments may address the risk of the pilot mistakenly altering a switch position, or a switch (e.g., a control switch) failing.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this regard, a coupling of entities may refer to either a direct or an indirect connection.

Figure 1:
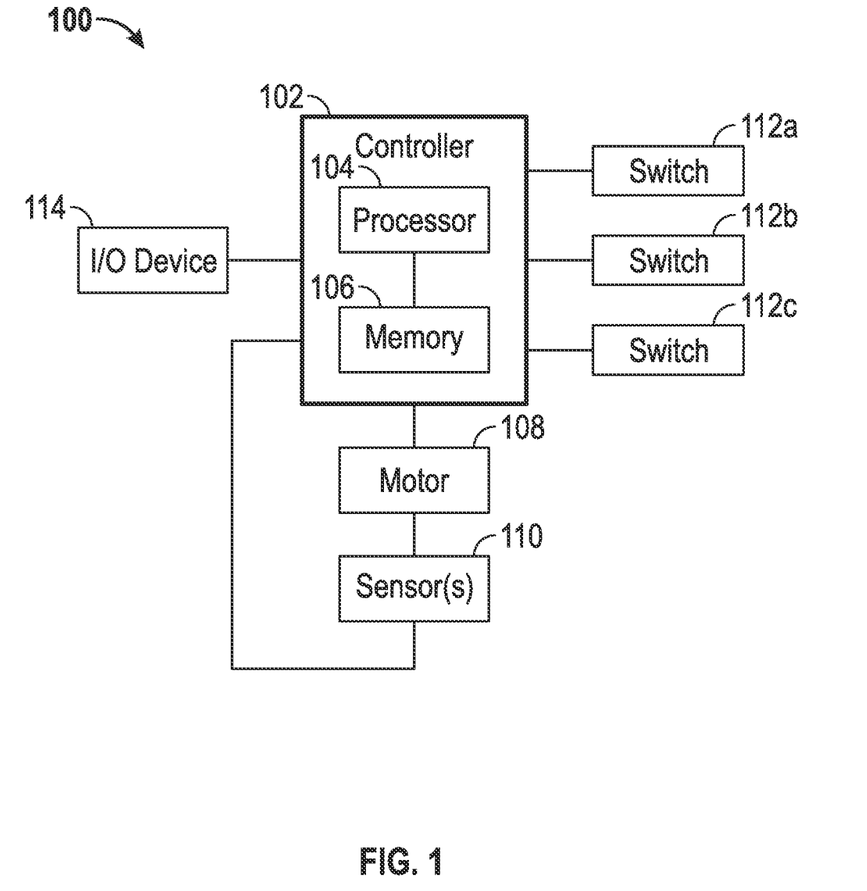
FIG. 1 illustrates a system architecture in accordance with one or more aspects of this disclosure.

FIG. 1 illustrates a system architecture 100 in accordance with one or more embodiments of this disclosure. The architecture 100 may be associated with a vehicle control system, such as a control system for a helicopter.

The architecture 100 may be used as an interface to control a helicopter in one or more modes of operation. For example, the architecture 100 may be used by a pilot during startup, ground check, and flight, as described further below.

As shown in FIG. 1, the architecture 100 may include a controller 102. The controller 102 may be configured to execute one or more algorithms, methods, or processes in connection with, e.g., helicopter operations. In order to facilitate such execution, the controller 102 may include one or more processors, such as a processor 104. One or more memories, such as a memory 106, may store instructions that, when executed by the processor 104, causes the controller 102 (or another entity) to perform one or more methodological acts. For example, execution of the instructions may cause the controller 102 to command a speed or torque of a motor 108. The controller 102 may regulate one or more operational parameters associated with the motor 108 based on one or more imposed controls.

In some embodiments, one or more sensors 110 may monitor one or more parameters associated with operation of the motor 108, such as the actual speed or torque of the motor 108. The sensed parameter(s) may be provided by the sensor(s) 110 to the controller 102 to enable the controller 102 to match or regulate the motor's actual operating performance or characteristics with commanded or set performance characteristics.

The controller 102 may detect, receive, or monitor a state or position of one or more switches, such as switches 112a-112c. The switches 112a-112c may serve as an interface for a pilot to selectively control operation of a helicopter. For example, the switches 112a-112c may serve as inputs to control the speed or torque associated with the motor 108 based on a state or position of the switches 112a-112c as selected by the pilot.

The switch 112a may be configured to provide three (3) states or positions.

A first position of the switch 112a may correspond to a "standby" mode. In the standby mode, a helicopter may be started without engaging the motor 108.

A second position of the switch 112a may correspond to a "manual" mode, wherein the torque of the motor 108 may be regulated to a torque limit or threshold (referred to herein as curve A), potentially as a function of speed of the motor 108. In the manual mode, the speed of the motor 108 may be regulated to a first speed limit or threshold (referred to herein as curve B). In some embodiments, curve B may be specified in terms of a rate of change of the speed of the motor 108. For example, curve B may be equal to 400 revolutions per minute (RPMs) per second. As such, when curve B is applied, the speed of motor 108 might not be allowed to increase or decrease in an amount greater than 400 RPM/sec.

A third position of the switch 112a may correspond to an "automatic" mode. In the automatic mode, there might not be any torque restrictions or limitations imposed on the motor 108 (e.g., curve A might not be applied), and the speed of the motor 108 may be regulated to a second speed limit or threshold (referred to herein as curve C). In some embodiments, curve C may be specified in terms of a rate of change of the speed of the motor 108. For example, curve C may be equal to 400 revolutions per minute (RPMs) per second. As such, when curve C is applied, the speed of motor 108 might not be allowed to increase or decrease in an amount greater than 400 RPM/sec.

In some embodiments, the switch 112a may correspond to a rotary type of switch. Due to the rotary nature of the switch 112a in such embodiments, it might not be possible to change the state or position of the switch from the first position (e.g., standby mode) directly to the third position (e.g., automatic mode). The switch 112a may be located in an instrument panel of the helicopter. The switch 112a may correspond to, or be termed, an electrical control unit (ECU) switch.

The switch 112b may be configured to provide two (2) states or positions.

A first position of the switch 112b may correspond to an "idle" mode. In the idle mode, the speed of the motor 108 may be regulated to a first threshold, such as 1500 RPM. At this speed, the pilot may be able to safely perform normal rotor engagements, control checks, and mechanical system checks. Such operations may be useful when the helicopter is located on the ground (e.g., prior to takeoff). The idle mode may be used to immediately reduce the speed and torque of the motor 108 in flight should a driven train failure occur.

A second position of the switch 112b may correspond to a "fly" mode. In the fly mode, the speed of the motor 108 may be regulated such that it does not exceed a second threshold, such as 3200 RPM. At this speed, the rotor speed may be sufficient for the helicopter to take-off and fly. In the fly mode, the pilot may have an ability to adjust the speed of the motor 108. For example, the pilot may be able to adjust the speed of the motor 108 between a third threshold (e.g., 3000 RPM) and the second threshold (e.g., 3200 RPM) via the switch 112c. In some embodiments, a rate of change in terms of the speed adjustment may be provided. For example, a pilot may be able to adjust the speed at a rate of 100 RPM/second.

In some embodiments, the switch 112b may correspond to a rotary type of switch. The switch 112b may be located in a stick, such as a control stick, of the helicopter.

The switch 112c may be configured to provide three (3) states or positions.

A first position of the switch 112c may correspond to an "increment" mode. In the increment mode, the speed of the motor 108 may be commanded to increase.

A second position of the switch 112c may correspond to a "neutral" mode. In the neutral mode, the speed of the motor 108 may be commanded to remain the same.

A third position of the switch 112c may correspond to a "decrement" mode. In the decrement mode, the speed of the motor 108 may be commanded to decrease.

In some embodiments, the switch 112c may correspond to a spring center return type of switch. In such embodiments, the second position of the switch 112c (e.g., neutral mode) may correspond to the default or center position. The first and third positions of the switch 112c (e.g., increment mode and decrement mode) may be selected or commanded by the pilot holding the switch 112c in those respective positions. The switch 112c may be located in a stick, such as a control stick, of the helicopter.

The architecture 100 may include one or more input/output (I/O) devices, such as an I/O device 114. The I/O device 114 may be used to present information to, or receive input selections from, a user (e.g., a pilot). The I/O device 114 may include one or more of a graphical user interface (GUI), a display screen, a touchscreen, a keyboard, a joystick, a pushbutton, a microphone, a speaker, etc.

The architecture 100 is illustrative. In some embodiments, additional components or entities not shown in FIG. 1 may be included. In some embodiments, one or more of the components or entities may be optional. In some embodiments, the components or entities of the architecture 100 may be arranged or configured differently from what is shown in FIG. 1. In some embodiments, one or more components or entities may be implemented using analog and/or digital hardware, firmware, software, or any combination thereof.

Figure 2:
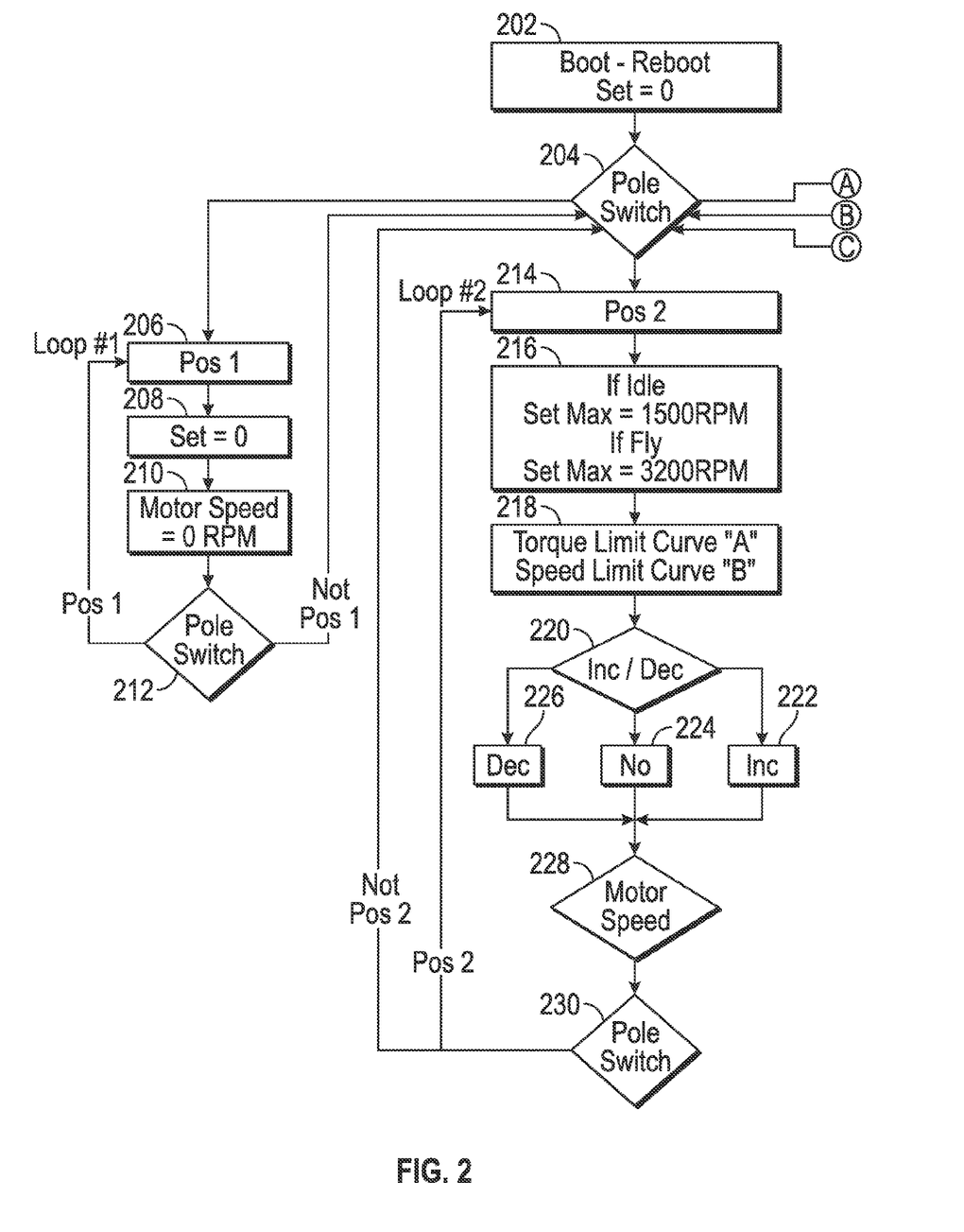
FIG. 2 illustrates a flow chart in accordance with one or more aspects of this disclosure.

FIG. 2 illustrates a flow chart that may be used in connection with one or more components, devices, or architectures. For ease of illustration and description, the flow chart of FIG. 2 is described in connection with the architecture 100 of FIG. 1. The flow chart of FIG. 2 may be used to provide for operation of a helicopter.

For illustrative purposes, and ease of explanation, the flow chart of FIG. 2 is depicted as being structured as four loops, labeled loop 1-loop 4. In some embodiments, two or more of the loops, or portions thereof, may be combined. In some embodiments, additional loops (not shown in FIG. 2) may be included. In some embodiments, one or more of the loops, or portion(s) thereof, may be optional. One or more of the loops may correspond to a set of logic. The logic may be configured to regulate a drive system, such as preventing an electric drive system from exceeding a parameter of a component associated with a safe operation of a helicopter. As described below, the operations associated with the loops 1-4 may be selected by a user (e.g., a pilot) via one or more of the switches 112a-112c.

The flow chart may be entered based on a system boot or re-boot in 202. At boot/re-boot 202, all loops and counters and "set" or commanded speeds may be reset to zero. The switch 112a may be assumed to be in the first position (e.g., standby mode). The switch 112b may be assumed to be in the first position (e.g., idle mode). The switch 112c may be assumed to be in the second position (e.g., neutral mode).

Following boot/re-boot 202, flow may proceed to 204. In 204, the state or position of the switch 112a may be examined or monitored. If the switch 112a is in the first position (e.g., standby mode), flow may proceed from 204 to 206, which may correspond to the start of loop 1. If the switch 112a is in the second position (e.g., manual mode), flow may proceed from 204 to 214, which may correspond to the start of loop 2. If the switch 112a is in the third position (e.g., automatic mode), flow may proceed from 204 to 232, which may correspond to the start of loop 3.

Loop 1 may be used to allow for electrical startup of the helicopter without engaging a motor (e.g., motor 108 of FIG. 1). Loop 1 may be used by a pilot to check initial settings, initiate pre-flight procedures, check a battery condition, etc., without danger from a turning rotor system.

Loop 1 may be selected by the pilot by placing the switch 112a in the first position (e.g., standby mode), as shown in 206. In loop 1, the speed of the motor 108 may be set to zero (0) RPM, as shown in 208. In loop 1, the actual speed of the motor 108 may be zero (0) RPM, as shown in 210. In 212, the position of the switch 112a may be checked by the controller 102. If during the check of 212 the controller 102 determines that the switch 112a is still in the first position, flow may proceed from 212 to 206. Otherwise, if during the check of 212 the controller 102 determines that the switch 112a is no longer in the first position, flow may proceed from 212 to 204.

Loop 2 may allow a pilot to manually increase the speed of the motor 108 from, e.g., zero (0) to a flight speed (e.g., 3200 RPM). The increase in speed may be achieved via the switch 112c (e.g., by placing the switch 112c in the first position (e.g., increment mode)). As shown in FIG. 2, loop 2 may be divided into two selectable phases: "ground check" and "flight."

The pilot may select the first position for the switch 112b (e.g., idle mode) to enter or utilize the ground check phase. In the ground check phase, the motor 108 may be regulated to a speed range of, e.g., 0-1500 RPM. In the ground check phase, the rate of change of the torque may be regulated according to curve A. In the ground check phase, the rate of change of the speed may be regulated according to curve B.

The pilot may select the second position for the switch 112b (e.g., fly mode) to enter or utilize the flight phase. In the flight phase, the speed of the motor 108 may be increased to a flight speed, such as a(n average) flight speed of 3100 RPM. In the flight phase, the rate of change of the torque may be regulated according to curve A. In the flight phase, the rate of change of the speed may be regulated according to curve B.

As shown in FIG. 2, loop 2 may be entered in 214, which may correspond to the second position of the switch 112a having been selected. In 216, a maximum speed for the motor 108 may be set at a first threshold (e.g., 1500 RPM) when the switch 112b is in the first position (e.g., idle mode), and may be set at a second threshold (e.g., 3200 RPM) when the switch 112b is in the second position (e.g., fly mode). Limits regarding the rate of change of the torque (e.g., curve A) and speed (e.g., curve B) of the motor 108 may be applied in 218. In 220, a determination may be made by the controller 102 regarding the state or position of the switch 112c. If, in 220, the controller 102 determines that the switch 112c is in the first position (e.g., increment mode) as indicated in 222, the speed of the motor 108 may be commanded to increase in 228. If, in 220, the controller 102 determines that the switch 112c is in the second position (e.g., neutral mode) as indicated in 224, the speed of the motor 108 may be commanded to remain the same (which may, in some embodiments, correspond to no command being issued) in 228. If, in 220, the controller 102 determines that the switch 112c is in the third position (e.g., decrement mode) as indicated in 226, the speed of the motor 108 may be commanded to decrease in 228. In 230, the position of the switch 112a may be checked by the controller 102. If during the check of 230 the controller 102 determines that the switch 112a is still in the second position, flow may proceed from 230 to 214. Otherwise, if during the check of 230 the controller 102 determines that the switch 112a is no longer in the second position, flow may proceed from 230 to 204.

Loop 3 may allow a pilot to automatically increase the speed of the motor 108 from, e.g., zero (0) to a flight speed (e.g., a speed greater than 3 000 RPM) via software driven preset motor speeds. Within loop 3, the pilot may safely increase the motor speed to either its ground check or flight phase speeds based on the position of the switch 112b as described further below.

As shown in FIG. 2, loop 3 may be entered in 232, which may correspond to the third position of the switch 112a having been selected. In 234, a maximum speed for the motor 108 may be set at a first threshold (e.g., 1500 RPM) when the switch 112b is in the first position (e.g., idle mode), and may be set at a second threshold (e.g., 3100 RPM) when the switch 112b is in the second position (e.g., fly mode). Limits regarding the rate of change of the torque (e.g., curve A) and speed (e.g., curve B) of the motor 108 may be applied in 236. In 238, the speed of the motor may be commanded to, e.g., increase to the maximum speed established in 234. In 240, the position of the switch 112a may be checked by the controller 102. If during the check of 240 the controller determines that the switch 112a is no longer in the third position, flow may proceed from 240 to 204; otherwise, flow may proceed from 240 to 242. In 242, the controller 102 may determine: (A) whether the switch 112a is in the third position (e.g., automatic mode), (B) whether the switch 112b is in the second position (e.g. fly mode), and (C) whether the speed of the engine exceeds a threshold (e.g., 3000 RPM). If, in 242, the controller 102 determines that one or more of (A) through (C) is not true, flow may proceed from 242 to 232. On the other hand, if in 242 the controller 102 determines that all of (A) through (C) are true, flow may proceed from 242 to 244.

The flow from 242 to 244 may coincide with the start of loop 4. The flow from loop 3 to loop 4 may take place automatically (e.g., no pilot action required). Loop 4 may be used to govern the speed of the motor 108 when the helicopter is in flight.

As shown in FIG. 2, in 244, no torque limit may be applied (e.g., the application of curve A associated with 236 may be removed) and the speed of the motor 108 may be regulated in accordance with curve C (e.g., the application of curve B associated with 236 may be removed, or replaced by curve C). In 246, a determination may be made by the controller 102 regarding the state or position of the switch 112c. If, in 246, the controller 102 determines that the switch 112c is in the first position (e.g., increment mode) as indicated in 248, the speed of the motor 108 may be commanded to increase in 254. If, in 246, the controller 102 determines that the switch 112c is in the second position (e.g., neutral mode) as indicated in 250, the speed of the motor 108 may be commanded to remain the same (which may, in some embodiments, correspond to no command being issued) in 254. If, in 246, the controller 102 determines that the switch 112c is in the third position (e.g., decrement mode) as indicated in 252, the speed of the motor 108 may be commanded to decrease in 254. In 256, the position of the switch 112a may be checked by the controller 102. If during the check of 256 the controller 102 determines that the switch 112a is no longer in the third position (and not in the first position), flow may proceed from 256 to 204; otherwise, flow may proceed from 256 to 258. In 258, the controller 102 may determine the state of the switch 112b. If during the check of 258 the controller determines that the switch 112b is in the first position (e.g. idle mode), the speed of the motor 108 may be commanded to, e.g., 1500 RPM, and flow may proceed from 258 to 244. If, at any time during the sequence of loop 4 the pilot changes the state of the switch 112b from the first position (e.g., idle mode) to the second position (e.g., fly mode), the controller 102 may command the speed of the motor 108 to be set at a(n average) flight speed, e.g., 3100 RPM, and the speed of the motor 108 may increase in accordance with curve C.

In some embodiments, at any time after entering loop 2, a pilot may be allowed to change the status of the helicopter from a fly or flight mode (e.g., the second position of the switch 112b) to an idle mode (e.g., the first position of the switch 112b). This capability may be designed to allow the pilot to secure the motor 108 and enter a so-called "autorotation maneuver," which may be used in the event of an emergency (e.g., a power train failure in flight).

During an autorotation maneuver, the helicopter may be returned to the ground. If sufficient altitude is available the rotor system may be accelerated by allowing a tradeoff of reducing altitude for increasing rotor energy. During this controlled descent from altitude, the rotor may be sped up beyond the normal operating speed (e.g., possibly as high as 125%). An overrunning clutch may be provided for such a purpose between the engine (e.g., motor 108) and a gearbox, such as a main gearbox. As the helicopter nears the ground, the stored rotor energy may be used to slow the decent, allowing for a controlled landing. Motor control and energy storage systems may be configured to provide an immediate, controlled shutdown without exposing the helicopter or those aboard at risk.

In some embodiments, techniques may be used to mitigate against a failure of a user switch closure. One or more switches (e.g., switches 112a-112c) may be double pole double throw (DPDT). The switch(es) may be read and compared, with a miss-compare resulting in a fault. Faults that occur while in loop 1, loop 2, and loop 3 may result in a standby mode being entered (e.g., loop 1 being entered). Faults that occur while in loop 4 may result in no change (e.g., remaining in loop 4) until a valid input is detected.

Figure 3:
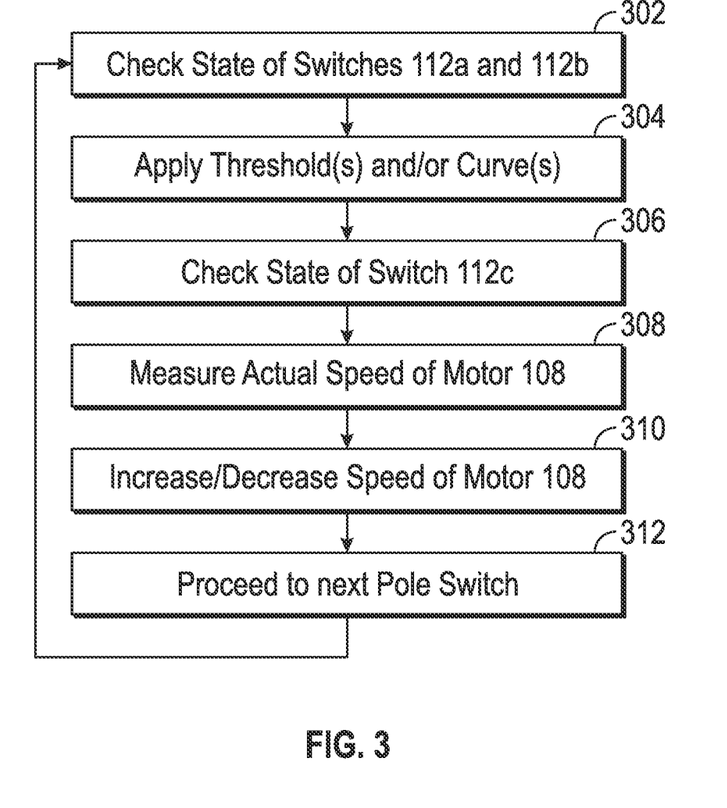
FIG. 3 illustrates a method in accordance with the flow chart of FIG. 2.

One or more of the loops 1-4 may be cycled at a given rate or frequency, such as one hundred (100) times per second. One or more of the loops 1-4 may include one or more of the following steps, as shown in FIG. 3: (302) each time that a "pole switch" is reached in the algorithm (e.g., 204, 212, 230, 240, 256 of FIG. 2), check the state of the switch 112a and the switch 112b; (304) apply one or more speed thresholds (e.g., 1500 RPM; 3100 RPM) and one or more curves (e.g., curves A, B, or C); (306) check the state of the switch 112c for an input specification of commanded (set) motor speed; (308) measure the actual motor speed (e.g., the current speed of the motor 108); (310) based upon the actual motor speed, increase/decrease the motor speed (subject to any thresholds and/or curves) so that the magnitude of the difference between the actual and commanded (set) speed decreases such that the actual motor speed converges to the commanded (set) speed; (312) proceed to the next "pole switch" (if exiting a given loop, proceed to the next closest pole switch; if exit conditions are not met, proceed to the pole switch at the top of the loop being executed).

Figure 4:
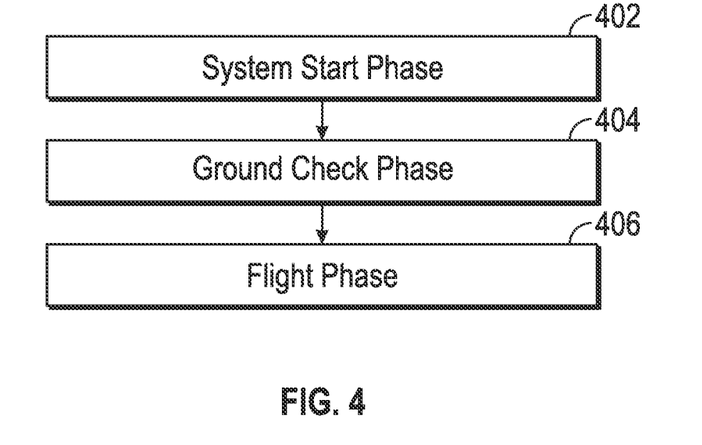
FIG. 4 illustrates a method of control usage in accordance with one or more aspects of this disclosure.

FIG. 4 illustrates a method of control usage. The control usage of FIG. 4 may represent a way of sequencing through various modes or phases of operation as described herein. For ease of illustration, the method of FIG. 4 is described in connection with the architecture 100 of FIG. 1 and the flow chart of FIG. 2. The method may be adapted to accommodate other architectures and/or flow charts.

In 402, a helicopter system start may be initiated. In the system start 402, it may be assumed the motor 108 is off and the controller 102 is powered. In the system start 402, it may be assumed that the switch 112a is in the first position (e.g., standby mode). Information may be displayed but the motor 108 may be, and remain, unpowered. The system start 402 may be associated with loop 1 of FIG. 2.

In 404, the ground check phase may be entered. Operation within the ground check phase 404 may be a function of the state of the switch 112a.

In the ground check phase 404, if the switch 112a is in the second position, then a "manual" mode of operation may be provided. The flow from 402 to 404 may coincide with a flow from loop 1 to loop 2 in FIG. 2 under such circumstances.

In the ground check phase 404, if the switch 112a is in the third position, then an "automatic" mode of operation may be provided. The flow from 402 to 404 may coincide with a flow from loop 1 to loop 3 in FIG. 2 under such circumstances.

In 406, a flight phase may be entered. The flight phase 406 may correspond to loop 4 of FIG. 2. Thus, in order to enter the flight phase 406 from the ground check phase 404: (1) the switch 112a may need to be in the third position (e.g., automatic mode), (2) the switch 112b may need to be in the second position (e.g., fly mode), and (3) the speed of the motor 108 may need to be greater than a threshold (e.g., 3000 RPM).

The flow charts and methods described herein are illustrative. In some embodiments, one or more of the steps (or portions thereof) may be optional. In some embodiments, additional steps not shown may be included. In some embodiments, one or more of the flow charts or methods may execute in an order or sequence different from what is illustrated.

As described herein, a rotor may be advanced from rest to 100% of flight speed using a manual mode or an automatic mode. In the manual mode, a pilot may be given complete "set" control while protecting against excessive torque. In the automatic mode, a speed of a motor may be pre-set, and the speed of the motor may slowly and steadily advance to 100% flight speed at a pre-set rate. In the automatic mode, a pause at, e.g., 50% of the flight speed may be possible. The pilot may elect to exit the automatic mode and (re-)enter the manual mode at any time, which might not result in a sudden motor change.

The values and configurations described herein are illustrative. In some embodiments, different values or configurations may be used. For example, in some embodiments one or more curves, rates, and/or thresholds may be used. The selection of a particular curve, rate, or threshold may be a function of one or more inputs or conditions, such as a selection of a particular helicopter to use in connection with a given motor.

Embodiments of the disclosure may include a mechanical system. The mechanical system may be configured to throttle or control a motor. For example, in some embodiments a gear reduction may be used to reduce the extent to which a change in a switch position is translated into a change in an operating parameter associated with a motor.

In some embodiments, a digital system may be included. The digital system may be configured to apply one or more curves or thresholds based on knowledge (e.g., programmed knowledge) of how close a component is to a tolerance (e.g., a failure or fault tolerance). The digital system may include one or more sensors in order to measure and/or control one or more parameters of a motor's operation.

In some embodiments, a mechanism may be used to enhance or provide safety features for a helicopter. The mechanism may include a switch, such as a so-called "kill-switch." The kill-switch may be configured to remove power from one or more components or entities of the helicopter. For example, if the helicopter's battery caught fire, the kill-switch may be configured to remove power from/to the battery upon detecting the fire. Additional factors or considerations may be used or applied to determine the state of the kill-switch.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments of the disclosure may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments of the disclosure may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein. In some embodiments, the functionality described herein may be implemented in hardware, software, firmware, or any combination thereof.

Embodiments of the disclosure may be tied to one or more particular machines. For example, a controller may be configured to monitor a state or position of one or more switches. Based on the position of the switch(es), the controller may select one or more parameters to control the operation of a motor, and may enter one or more modes or phases of operation.

Embodiments of the disclosure may transform an article into a different state or thing. For example, a helicopter's motor speed and/or torque may be controlled to reduce the likelihood of component failure or damage and to enhance the safety of operation of the helicopter.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. An apparatus comprising:
   at least two switches;
   at least one processor; and
   memory storing instructions that, when executed by the at least one processor, cause the apparatus to:
   regulate an operation of a motor based at least in part on a control imposed on an output torque of the motor and a rate of change of a speed of the motor, wherein the control is a function of a position of each of the least two switches;
   the at least two switches including a first switch configured to provide a first position in which the motor is disengaged from a drive system, a second position in which a manual mode of operation id provided, and a third position is which an automatic mode of operation is provided;
   the at least two switches include a second switch configured to select an idle mode of operation wherein a threshold is associated with a corresponding first maximum value for the speed of the motor and a fly mode of operation wherein the threshold is associated with a corresponding second maximum value for speed of the motor, the second maximum value being greater than the first maximum value.

2. The apparatus of claim 1, wherein the instructions, when executed by the at least one processor, cause the apparatus to:
   limit a rate of change of the output torque of the motor based on the control.

3. The apparatus of claim 1, wherein the apparatus is associated with the operation of an aircraft, and wherein a value for the control is a function of whether the aircraft is in a system start phase, a ground check phase, and a flight phase.

4. The apparatus of claim 1, wherein:
   the at least two switches includes a third switch configured to provide a first position that commands the speed of the motor to increase subject to the control, a second position that commands the speed of the motor to remain the same, and a third position that commands the speed of the motor to decrease subject to the control.

5. An apparatus comprising:
   at least one processor; and
   memory storing instructions that, when executed by the at least one processor, cause the apparatus to:
   regulate an operation of a motor based at least in part on a control imposed on an output torque of the motor and a rate of change of a speed of the motor;
   wherein the apparatus is associated with the operation of an aircraft, and wherein a value for the control is a function of whether the aircraft is in a system start phase, a ground check phase, and a flight phase;
   wherein the ground check phase comprises an idle mode wherein a threshold is associated with a corresponding first maximum value for the speed of the motor and a fly mode wherein the threshold is associated with a corresponding second maximum value for the speed of the motor.

6. A system comprising:
   a motor;
   at least two switches; and
   a controller configured to regulate operation of the motor in accordance with a control imposed on an output torque of the motor and a rate of change of a speed of the motor based at least in part on a determined position of each of the at least two switches;
   the at east two switches including a first switch configured to provide a first position in which the motor is disengaged from a drive system, a second position in which a manual mode, of operation is provided, and a third position in which an automatic mode of operation is provided;
   the at least two switches include a second switch configured to select an idle mode of operation wherein a threshold is associated with a corresponding first maximum value for the speed of the motor and a fly mode of operation wherein the threshold is associated with a corresponding second maximum value for the speed of the motor, the second maximum value being greater than the first maximum value.

7. The system of claim 6, wherein:
   the at least two switches includes a third switch configured to provide a first position that commands the speed of the motor to increase subject to the control, a second position that commands the speed of the motor to remain the same, and a third position that commands the speed of the motor to decrease subject to the control.

8. The system of claim 7, wherein the controller is configured to determine an actual speed of the motor and to regulate the motor such that the actual speed of the motor converges to the commanded speed of the motor.

9. The system of claim 6, wherein the controller is configured to limit a rate of change of the output torque of the motor.

10. The system of claim 6, wherein the control imposed on the rate of change of the speed of the motor and the rate of change of the output torque of the motor is removed when the switch is in a position associated with an automatic mode of operation and when the speed of the motor is greater than a predetermined value.

11. The system of claim 6, wherein the controller is configured to regulate operation of the motor in accordance with a second control associated with the rate of change of the speed of the motor when the switch is in the position associated with an automatic mode of operation and when the speed of the motor is greater than a predetermined value.

12. The system of claim 6, wherein the control comprises a specification of at least one of a minimum speed of the motor and a maximum speed of the motor.

13. The system of claim 6, wherein the controller is implemented using analog hardware.

14. A method comprising:
regulating an operation of a motor based at least in part on a control imposed on an output torque of the motor and a speed of the motor;
wherein the motor is associated with an aircraft, and wherein the regulation of the motor is based on whether the aircraft is operating in a system start phase, a ground check phase, or a flight phase;
wherein the ground check phase comprises a first mode wherein a speed of the motor is established in response to a user input, and wherein the ground check phase comprises a second mode wherein the speed of the motor is established in accordance with a predetermined value associated with flight of the aircraft.

15. The method of claim 14, further comprising:
based at least in part on determining that a speed of the motor is greater than a predetermined value, removing the control, and applying a second control to at least one of the output torque of the motor, the speed of the motor, a rate of change of the output torque of the motor, and a rate of change of the speed of the motor.

\* \* \* \* \*